United States Patent
Bessonov et al.

(10) Patent No.: US 11,296,895 B2
(45) Date of Patent: Apr. 5, 2022

(54) SYSTEMS AND METHODS FOR PRESERVING PRIVACY AND INCENTIVIZING THIRD-PARTY DATA SHARING

(71) Applicant: BITCLAVE PTE. LTD., Trivex (SG)

(72) Inventors: Alexander Bessonov, San Jose, CA (US); Patrick Tague, Mountain View, CA (US); Mark Shwartzman, Campbell, CA (US); Stephen Winston, San Jose, CA (US); Vadim Gore, Beaverton, OR (US)

(73) Assignee: Bitclave Pte. Ltd., Trivex (SG)

( * ) Notice: Subject to any disclaimer, the term of this patent is extended or adjusted under 35 U.S.C. 154(b) by 338 days.

(21) Appl. No.: 16/568,132

(22) Filed: Sep. 11, 2019

(65) Prior Publication Data

US 2020/0084051 A1 Mar. 12, 2020

Related U.S. Application Data

(60) Provisional application No. 62/730,448, filed on Sep. 12, 2018.

(51) Int. Cl.
*H04L 29/06* (2006.01)
*H04L 9/32* (2006.01)
*H04L 9/06* (2006.01)
*G06Q 20/38* (2012.01)

(52) U.S. Cl.
CPC ......... *H04L 9/3268* (2013.01); *G06Q 20/385* (2013.01); *G06Q 20/389* (2013.01); *H04L 9/0637* (2013.01); *H04L 9/3234* (2013.01); *H04L 9/3247* (2013.01); *G06Q 2220/00* (2013.01); *H04L 2209/38* (2013.01); *H04L 2209/42* (2013.01)

(58) Field of Classification Search
CPC ... H04L 9/3268; H04L 9/0637; H04L 9/3234; H04L 9/3237; H04L 2209/38; H04L 2209/42
USPC ........................................................ 713/156
See application file for complete search history.

(56) References Cited

U.S. PATENT DOCUMENTS 9,026,789 B2 * 5/2015 Brown .................. H04L 9/3265 713/156
2019/0363896 A1 * 11/2019 Finlow-Bates ....... H04L 9/3239

* cited by examiner

*Primary Examiner* — Longbit Chai
(74) *Attorney, Agent, or Firm* — Loza & Loza, LLP

(57) ABSTRACT

Methods and systems relating incentivizing a data provider to participate in a match making protocol between a business (second entity) to a user (first entity) are shown. Encryption techniques maintain the secrecy of the data providers data such as proprietary analytics of user information such that the data is need not be shared with users or businesses. Businesses can verify that the user has desired properties without learning the actual raw data owned by the data provider. Users initiate data sharing by explicit request but do not learn the actual raw data known to the data provider, only whether or not they satisfy the properties of interest. The data provider is incentivized because the business compensates the data provider for access to proofs of properties about user data.

20 Claims, 10 Drawing Sheets

SYSTEMS AND METHODS FOR PRESERVING PRIVACY AND INCENTIVIZING THIRD-PARTY DATA SHARING

CROSS REFERENCE TO RELATED APPLICATIONS

This patent application and claims the priority and benefit of U.S. provisional patent application No. 62/730,448, titled "PRIVACY-PRESERVING AND INCENTIVIZED THIRD-PARTY DATA SHARING," filed on Sep. 12, 2018, which is herein incorporated by reference in its entirety.

TECHNICAL FIELD

The embodiments herein relate to public key encryption, cryptographic digital signatures, block chains, encrypted data storage, transactions, and, more particularly, to incentivized data sharing while preserving privacy in a trustless ecosystem.

BACKGROUND

Block chain technology began receiving wide interest in 2008 with the popularization of the bitcoin cryptocurrency. Since then, a number of different block chain technologies have been deployed. In general, a block chain is a continuously growing list of records, called blocks, which are linked and secured using cryptography. By design, a block chain is inherently resistant to modification of the data stored in the blocks. Block chains are often described as open, distributed ledgers recording transactions in a verifiable and permanent way. This description is true for many block chains although private block chains and hybrid public/private block chains have been deployed. For use as a distributed ledger, a block chain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

Block chains can, as part of their specification, store and execute smart contracts. A transaction on the block chain can store a smart contract on the block chain. Another transaction can cause methods or subroutines within the smart contract to be executed, often writing data onto the block chain.

BRIEF SUMMARY

It is an aspect of the embodiments that a method for preserving privacy and incentivizing third-party data sharing can be implemented with a data provider maintaining a database containing property values for property identifiers for a large number of entities. A first entity can send a certification request to the data provider. The certification request can request a signed validation that the first entity has a first property regarding at least one of the property identifiers. After receiving the certification request the data provider can determine, based on the database, that the first entity does have the first property. After determining that the first entity has the first property, the data provider can produce the signed validation. The signed validation can be cryptographically signed by the data provider. The signed validation certifies that the first entity has the first property. The signed validation can certify that the first entity has the first property without revealing any of the property values. The data provider can protect entities' privacy by not sharing property values with the first entity, the second entity, or other entities. In particular, privacy is protected when other entities, including the first entity and the second entity, do not have access to the property values. The data provider's own privacy and secrets can be protected when other entities, including the first entity and the second entity, do not have access to the property values and the property identifiers. Even the identities of the entities whose data is in the database can be protected by not providing access to such data. After producing the signed validation, the data provider can proceed by providing the signed validation to the first entity.

After receiving the signed validation, the first entity can choose to authorize sharing the signed validation with a second entity, the second entity having made an offer that is valid for entities having the first property. By sending an authorization to the data provider, the first entity authorizes sharing the signed validation with the second entity. A token can be produced that includes a digital signature of validation data, the validation data comprising the signed validation and an entity identifier identifying the first entity. After producing the token, the token and a pseudonym can be sent to the second entity, the pseudonym masking the identity of the first entity from the second entity. For its own internal use, the data provider can associate the pseudonym with the first entity without revealing the association to any other entity.

Having received the token and the pseudonym, the second entity can opt to pursue a relationship with the first entity. The second entity, however, only knows that the first entity exists. The data provider has the identity of the first entity. The second entity can send an engagement request to the data provider. After receiving the engagement request, the data provider can proceed by providing the validation data to the second entity. The engagement request can include the pseudonym, the token, and a smart contract identifier for a smart contract. The smart contract can be stored on a block chain maintained by a plurality of network nodes. The data provider can be paid by the smart contract upon delivering the validation data to the second entity.

The data provider can provide one or more validation keys to other entities including the first entity and the second entity, the signed validation being verifiable using one of the validation keys. Cryptographic digital signature algorithms can use signing keys and validation keys. Signing keys are kept secret while validation keys can be widely shared. Data signed with a particular signing key can be verified only with the matching validation key. Signed data from the data provider can be verified as coming from the data provider because only the data provider knows the signing key. Any entity having the matching validation key can verify who signed the data. The data provider can sign the validation data to produce the token, the token being a digital signature. The validation data, once available, can be verified using token to thereby prove that the validation data was signed by the data provider and has not been changed since the token was generated.

The data, requests, and responses exchanged between the data producer, the first entity, and the second entity can be exchanged by placing the data on a block chain maintained by a plurality of network nodes. Certification requests, signed validations, authorizations, tokens and engagement requests can be stored on the block chain as transactions with agreed block chain addresses. The signed validation can be stored in association with the certification request by referencing the certification request within the signed validation, storing it at an agreed location, storing it the same data structure, storing it at location specified by the certification request, or by submitting it to a smart contract tracking certification requests and signed validations. An agreed location or address is one that is agreed to by both the sender and intended recipient. The certification request can be submitted as a transaction with a producer smart contract. The producer smart contract, which is stored on the block chain, can receive the certification request and can receive the authorization. The producer smart contract can be configured to provide verification that the signed validation was signed by the data provider because validation keys can be made public. As discussed above, a validation key need not be kept secret and can therefore be stored on the block chain and used by the producer smart contract.

The block chain can be accessible by the first entity, the second entity, and the data provider, the data provider maintaining the database. Tokens, discussed above, can be stored on the block chain in association with a pseudonym, also discussed above. The token can be stored in association with the pseudonym in much the same manner as the signed validation can be stored in association with the certification request, including submitting the pseudonym and token to the producer smart contract or to an offer smart contract. The offer, discussed above, can be published as a smart contract on the blockchain.

It is a further aspect of the embodiments that a computer readable medium storing computer readable instructions, that when executed on one or more processors, implements the method for preserving privacy and incentivizing third-party data sharing.

Non-transitory computer readable media can store data and computer readable instructions. A computer readable medium storing computer readable instructions that can be executed on one or more processors may implement methods for preserving privacy and incentivizing third-party data sharing.

BRIEF DESCRIPTION OF THE FIGURES

The embodiments herein will be better understood from the following detailed description with reference to the drawings, in which.

DETAILED DESCRIPTION OF EMBODIMENTS

Figure 1:
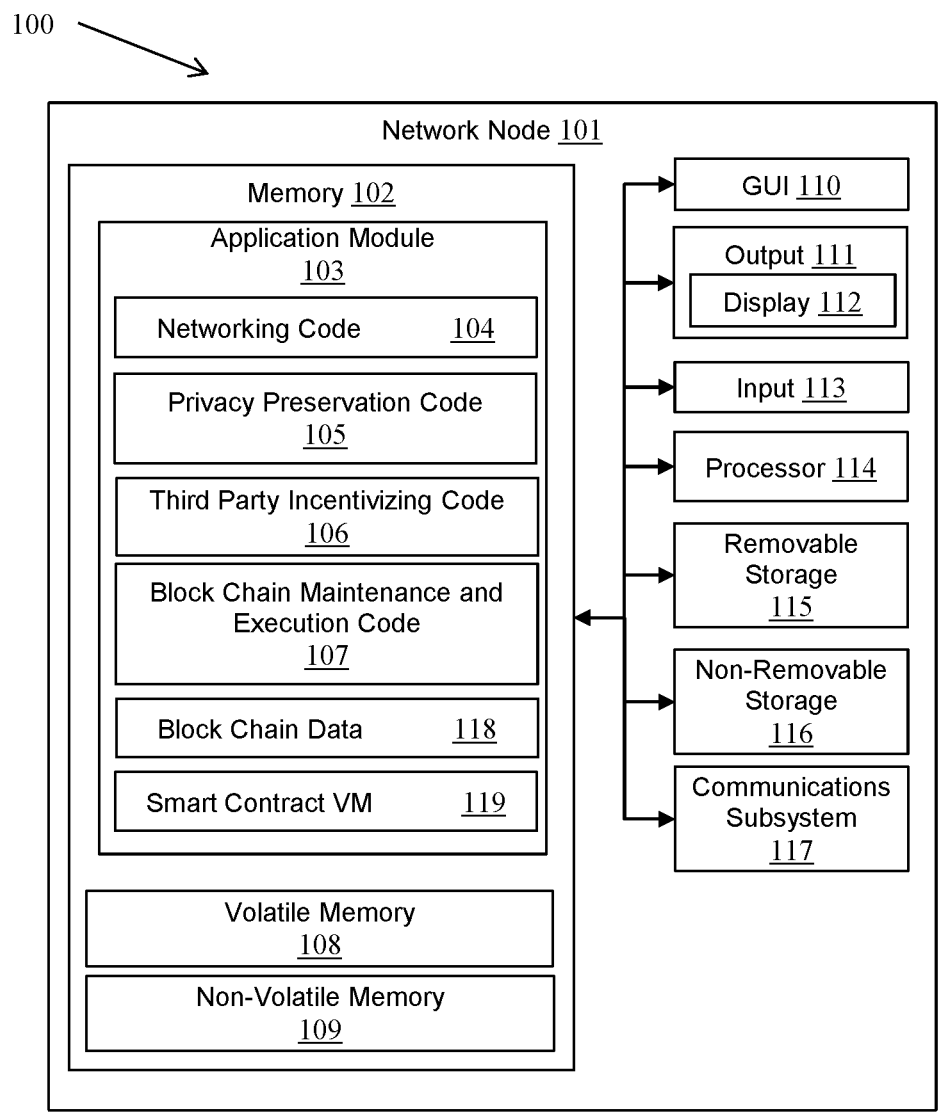
FIG. 1 is a high-level block diagram of a network node supporting systems and methods for preserving privacy and incentivizing third-party data sharing, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose systems and methods for preserving privacy and incentivizing third-party data sharing. Here, the third party is a data provider having information about the user. The embodiments can be realized on the currently deployed block chains supporting smart contracts such as BASE, Bitcoin, Ethereum, Steller, etc. BASE (BitClave Active Search Ecosystem) is a platform that allows people to store data and enable it for a specific use. In BASE there are two key actors: users and businesses. Users can build their digital persona profile in a way that directly specifies their preferences and interests. This profile is kept encrypted and no one, including BASE, can access it without the user's explicit permission. Businesses can market directly to relevant and motivated users, who match their target audience. If users agree to reveal their profile to a business, they can get compensated. The value is being transitioned directly from advertiser to user and not into the pocket of the middleman. A data provider can, at the user's request, help a user respond to an advertisement without revealing the user's personal information to the business.

A data provider can perform a match making service for businesses and users. A business can publish an offer that is valid only for qualified users. Qualified users can be users having certain properties (age, location, credit score, etc.) or combinations of properties. The offer can be a targeted advertisement to which the business wants responses only from qualified users. A user interested in accepting an offer may or may not know if they have those certain properties. The user can ask the data provider to certify that the offer is valid for the user. If the offer is valid for the user and the user so authorizes, the data provider can inform the business of a user interested in the offer, without revealing the user's identity or personal information. If the business is interested, it can send an engagement request to the data provider. The data provide can provide the user's identity, including contact information, to the business. The user and the business can then communicate directly. The business, the user, or both may pay that data provider for the successful match making. In the context of the embodiments described herein, the first entity can be a user and the second entity can be a business. The business (second entity) and the user (first entity) can, if both agree and if the user has certain properties, be placed in contact with one another without providing the user's personal information to the business until the data provider is guaranteed payment. Payment can be guaranteed by a smart contract that pays the data provider when the business learns the user's identity. The methods and systems described herein are an advance over current techniques in that a user's personal data is not revealed to a business and may even be concealed from the user. The data provider can refuse to provide certain information about a user to anyone while still having the ability to match users to businesses. A further advance is that the trustworthiness and accuracy of the data provider can be proven using the artifacts of the match making process. Those artifacts include the signed validations, tokens, pseudonyms, and engagement requests produced in the process of matching the user to the business based on the offer.

BASE relies on block chain for storage and management of data related to customer activities in the search ecosystem. Data can be stored in off-chain open storage like IPFS where only the hash of the data is stored on the blockchain. These activities are created by software endpoints operated by either the customers themselves or by the retailers they interact with. As such, various forms of software applications including retail websites and marketing dashboards can read to and write from the block chain. As the BASE ecosystem is decentralized and open, anyone can create such software that interacts with the customer and publish their data to the block chain. Of particular note, user-facing software has the capability to anonymize information contributed to the block chain, creating what is referred to as the anonymous activity ledger. Activity anonymization is done in a way that allows only authorized parties to attribute multiple activities to the same customer. For all other parties, the data is not attributable to specific individuals (or linkable beyond certain lengths of times) while remaining valuable for statistical and data aggregation purposes. This gives the customer control over what data is allowed to be created, shared, and accessed, all managed and enforced through the use of block chain and smart contracts.

At a high level, anonymity can be achieved by allowing a single user to post to the BASE activity ledger using a variety of unrelated pseudonyms, or alternate identities. The use of multiple identities is already supported in many block chain platforms, as any customer can create an arbitrary number of accounts, wallets, or public key identifiers; this is already common in cryptocurrency platforms like Bitcoin. There are several reasons, beyond privacy, that a user may want to do this. For example, suppose that a user uses BASE while shopping for business needs and also for personal needs. If both of these tasks are performed using the same identity, as is typically done today through monolithic ad networks, both of these roles are combined into a single "customer profile", so the user will be shown ads that relate to both their business and personal lives. If, however, a user could create two separate personas, based on different pseudonymous identities, the search activities could be effectively isolated from each other, allowing the user to separate the ads they see based on their current role. While the different pseudonyms approach solves customer concerns with regards to anonymization, it introduces a challenge for businesses as now they need to have a way to know that two different pseudonyms asking for a service actually belong to the same person, to prevent paying out a reward twice.

In a more general sense, user-facing software can support the use of multiple pseudonyms for a user's search activities, either in support of multiple personas as above, or to truly anonymize the user's search with a different pseudonym for each activity contributed to the ledger. Even in this case, BASE supports the ability to later allow the user to selectively reveal information about these anonymous posts. Specifically, metadata can be included in the activity's fields that can later be used to reveal the true identity of the user or to reveal links between different pseudonyms (even without exposing the user's true identity), noting that both of these can be allowed selectively to only a specific list of authorized parties.

As described above, users have control over how their data is shared, including data provided by third parties. However, a third-party data provider likely wants to be compensated for sharing the data they host, especially if they use proprietary analytics or private input streams to derive data pertaining to a particular user. Under the BASE model, third-party data providers should be compensated on a pay-per-access basis, providing an incentive for them to participate in the marketplace. Ideally, this compensation should come from the business's advertising budget, and this mechanism is designed to facilitate this multi-party interaction in a user-driven manner. However, if the third-party analytics and data are proprietary, they may want to protect the confidentiality of the raw data but allow the business and/or user to validate certain properties of the data. Aspects of the embodiments do not focus on the specific technology used to protect the third party's proprietary data and analytics, as such the validation technologies are described generically using a validation quantity, $V[prop]$, where prop is a particular property of interest on the data held by the third-party about the user. Disclosing the actual data to the business would of course allow them to validate any desirable property, since they can check the property prop on their own, though that is not desirable as described above. In view of the systems and methods described herein, businesses often want to validate that user analytics satisfy certain inequalities (e.g., age >25) or set membership conditions (e.g., home address is one of California, Nevada, or Oregon). One such existing technology that can allow the business to validate such conditions without accessing the raw data is a privacy-preserving range or membership query (see, for example, "*Conjunctive, Subset, and Range Queries on Encrypted Data*" by D. Boneh and B. Waters), which are cryptographic primitives designed for precisely these purposes.

The techniques described herein can use an interactive, multi-party protocol that: i) is initiated by the user; ii)

provides compensation from the business to the third-party provider; and (iii) can be verified by all parties. The techniques further involve provisioning for user anonymity, wherein the business does not learn the true identity of the user unless it is explicitly disclosed at a later time as part of the purchase or financial transaction. This can be achieved through the user authorizing the third-party provider to create and issue to the business an authorization token that is cryptographically bound to the user's identifier and the validation quantity of interest, while the token itself does not allow the business to recover the user's identifier or the raw data used to generate the validation quantity.

Referring now to the drawings where similar reference characters may denote corresponding features consistently throughout the figures, there are shown embodiments.

FIG. 1 is a high-level block diagram 100 of a network node 101 supporting systems and methods for preserving privacy and incentivizing third-party data sharing, according to embodiments disclosed herein. A computing device in the form of a computer 101 configured to interface with controllers, peripheral devices, and other elements disclosed herein may include one or more processing units 114, memory 102, removable storage 115, and non-removable storage 116. Memory 102 may include volatile memory 108 and non-volatile memory 109. Network node 101 may include or have access to a computing environment that includes a variety of transitory and non-transitory computer-readable media such as volatile memory 108 and non-volatile memory 109, removable storage 115 and non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including block chain data and computer code.

Network node 101 may include, or have access to, a computing environment that includes input 113, output 111, and a communications subsystem 117. The network node 101 may operate in a networked environment using a communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 111 is most commonly provided as a computer monitor, but may include any output device. Output 111 and/or input 113 may include a data collection apparatus associated with network node 101. In addition, input 113, which commonly includes a computer keyboard and/or pointing device such as a computer mouse, computer track pad, touch screen, or the like, allows a user to select and instruct network node 101. A user interface can be provided using output 111 and input 113. Output 111 may include a display 112 for displaying data and information for a user, or for interactively displaying a GUI (graphical user interface) 110. A GUI is typically responsive of user inputs entered through input 113 and typically displays images and data on display 112.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in application module 103, can include or be representative of software routines, software subroutines, software objects, etc. described herein, are stored on a computer-readable medium and are executable by the processor device (also called a processing unit) 114 of network node 101. The application module 103 can include computer code such as networking code 104, privacy preservation code 105, third party incentivizing code 106, block chain maintenance and execution code 107, block chain data 118, and smart contract VM 119. A hard drive, CD-ROM, RAM, Flash Memory, and a USB drive are just some examples of articles including a computer-readable medium. The privacy preserving code can include code that implements encryption, decryption, digital signing, and verification of digital signatures. Third party incentivizing code can include code that implements the methods describes herein that result in the data provider being paid for a verifiable lead.

Figure 2:
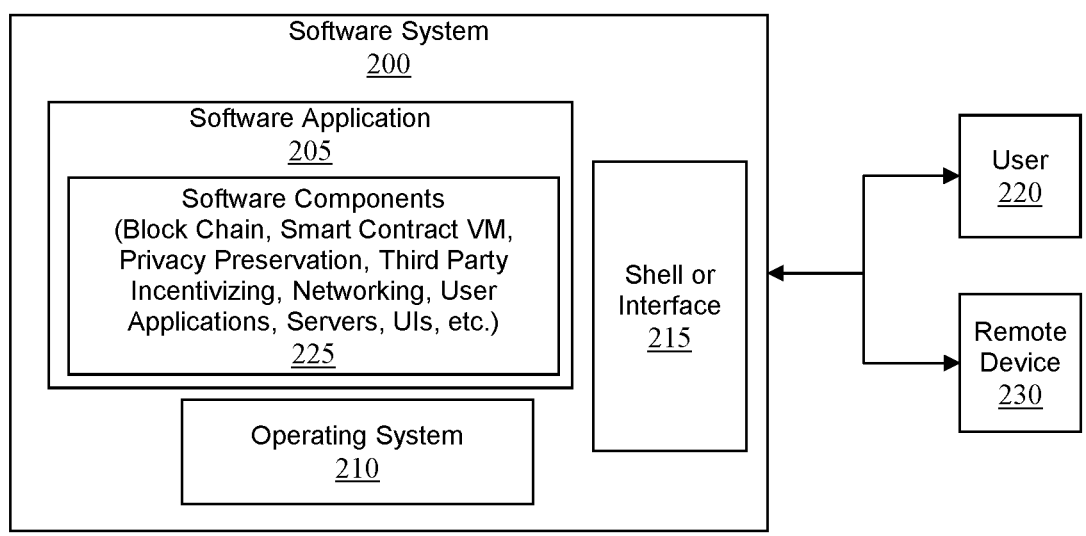
FIG. 2 is a high-level block diagram of a software system, according to embodiments disclosed herein.

FIG. 2 is a high-level block diagram of a software system 200, according to embodiments herein. FIG. 2 illustrates a software system 200, which may be employed for directing the operation of the data-processing systems such as network node 101. Software applications 325, may be stored in memory 102, on removable storage 115, or on non-removable storage 116, and generally includes and/or is associated with a kernel or operating system 210 and a shell or interface 215. One or more application programs may be "loaded" (i.e., transferred from removable storage 115 or non-removable storage 116 into the memory 102) for execution by the network node 101. An application program 205 can include software components 225 such as software modules, software subroutines, software objects, network code, server code, UI code, block chain code, smart contract VM code, privacy preservation code, third-party incentivizing code, etc. The software system 200 can have multiple software applications each containing software components. The network node 101 can receive user commands and data through interface 215, which can include input 113, output 111, and communications connection 117 accessible by a user 220 or remote device 230. These inputs may then be acted upon by the network node 101 in accordance with instructions from operating system 210 and/or software application 205 and any software components 225 thereof.

Generally, software components 225 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, operating system 210 and GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 210 and interface 215. The software application 205 can include, for example, software components 225, which can include instructions for carrying out steps or logical operations such as those shown and described herein.

The description herein is presented with respect to embodiments that can be embodied in the context of, or require the use of, a data-processing system such as network node 101, in conjunction with program code in an application module 103 in memory 102, software system 200, or network node 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. As discussed here, a VM can be different from a smart contract VM and the two terms should not be used interchangeably. A VM or container typically supplies an operating environment, appearing to be an operating system, to program code in an application module and software applications 205 running in the VM or container. A single physical computer can run a collection of VMs and containers. In fact, an entire network data processing system including a multitude of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 3:
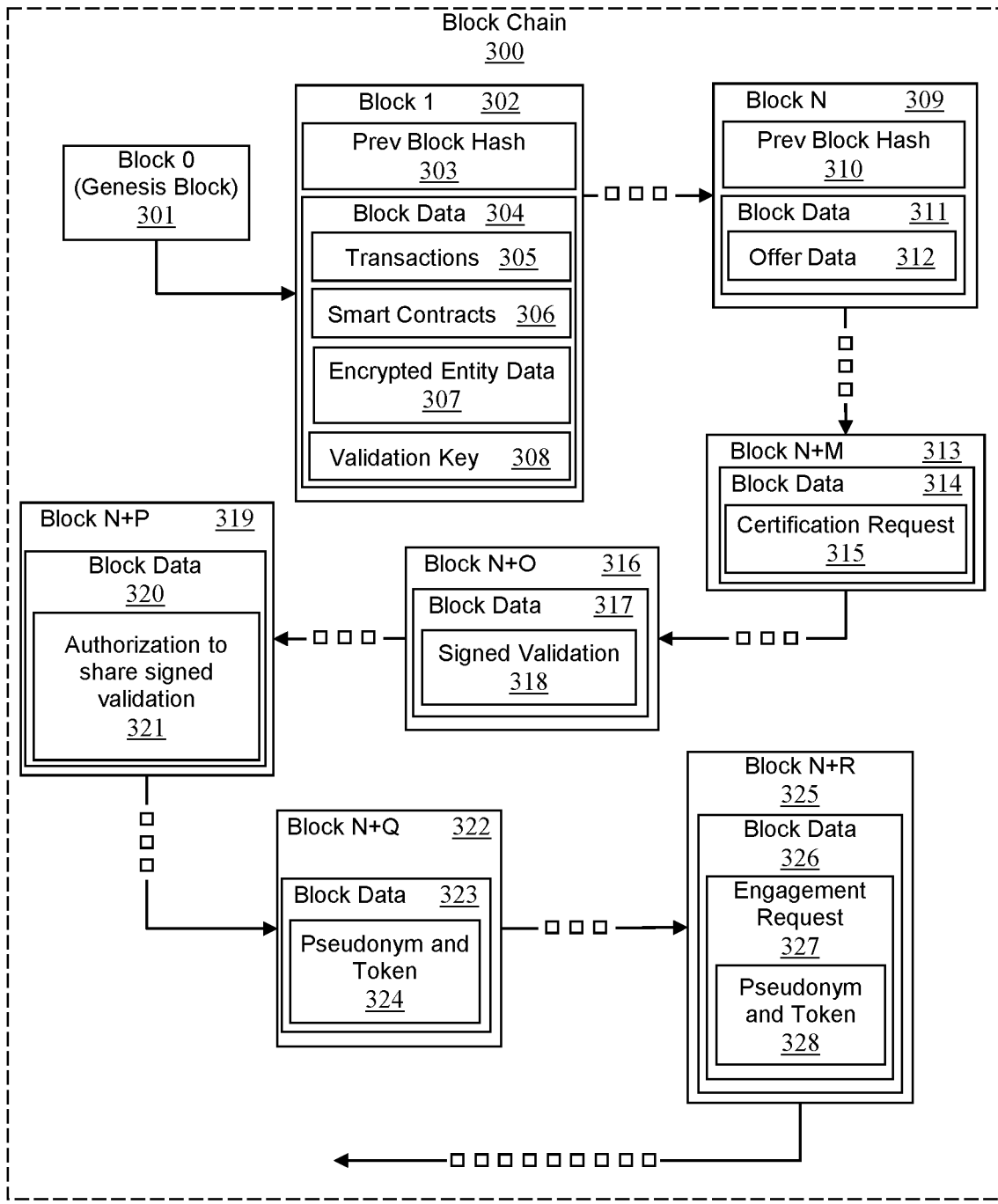
FIG. 3 is a high-level block diagram of a block chain, according to embodiments disclosed herein.

FIG. 3 is a high-level block diagram of a block chain 300, according to embodiments disclosed herein. The very first block, block 0 301, of a block chain is often called the genesis block. A block chain 300, being a sequence of blocks, block 1 302 follows block 0 301. Block 1 302 can contain a previous block hash 303, block data 304, a time stamp, and other information. Block data 304 can include transactions 305, smart contracts 306, encrypted entity data 307, validation keys 308, etc. For block 1 302, the previous block hash 303, can be the block hash of block 0 301. In many block chains, the previous block hash is a cryptographic signing, or digital signature, of the previous block. Altering a block on a block chain is immediately discoverable because the altered block's digital signature is different from that stored in the previous block hash of the next block. As such, the next block would also have to be altered to have the correct digital signature, changing its digital signature. It is the chain of digital signatures that makes block chains theoretically immutable because attempting to alter one block means that every subsequent block must be altered. Such alteration can be made arbitrarily difficult or unlikely through a signing protocol such as proof-of-work, proof-of-stake, randomly selected trusted party, etc. Those familiar with block chains or cryptocurrencies know of a variety of signing protocols.

Digital signatures can be used to cryptographically sign data such as a previous block, a transaction, user information, etc. Most block chains rely on one of the proven techniques for producing cryptographically secure digital signatures of data such as DSA (digital signature algorithm) developed by the National Institute of Standards and Technology, Elliptic curve DSA which is a variant of DSA, ElGamal, etc. Herein, digital signatures and cryptographic signatures refer to cryptographically secure signatures of data. A digital signature for specific data can be produced from the data and a private key. A digital signature can be verified using the data and a public key. Note that the data must be available in order to verify it using the public key. With respect to digital signatures, the private key is often called a signing key while the public key is often called a validation key.

Digital signatures are different from data encryption because in data encryption the data is encrypted with an encryption key and therefor unreadable without a decryption key. Digital signatures sign data, encrypt or unencrypted, such that the signature can be verified using the signer's public key and the signed data. Encryption transforms the data into encrypted data that is unreadable without a decryption key. In practice, data is encrypted using one of the proven data encryption techniques such as the Advanced Encryption Standard (AES), Blowfish, Twofish, Serpent, etc. Asymmetric encryption techniques use two keys, often called a private key and a public key, with one key decrypting what the other key encrypts. Symmetric techniques use a single key that both encrypts and decrypts.

Returning to FIG. 3, the block chain has a plethora of blocks. The arrows overlaid by tiny blocks, such as the arrow between block 1 302 and block N 309, indicate that there can be many intervening blocks. Following block N 309 on the block chain 300 are block N+M 313, block N+O 316, block N+P 319, block N+Q 322, and block N+R 325.

Block N 309 is shown including the block N−1 block hash 310 and block data 311. The block data includes an offer 312. The business may have published the offer 312 to the block chain. Note that the illustrated block 1 is a non-limiting example in that every block can contain transactions, smart contracts, data, encrypted data, and validation keys.

The block data 314 of block N+M 313 is illustrated as including a certification request 315. The first entity (the user) may have stored the certification request 315 on the block chain by recording data or a transaction on the block chain. The transaction may have been a transaction with a producer smart contract or other smart contract previously stored on the block chain. The block data 317 of block N+O 316 is illustrated as including a signed validation 318. The data producer may have stored the signed validation 318 on the block chain as data or a transaction. The transaction may have been a transaction with the producer smart contract or some other smart contract. The block data 320 of block N+P 319 is illustrated as including an authorization 321 to share the signed validation with a second entity (the business). The data producer may have stored the authorization 321 on the block chain as data or a transaction. The transaction may have been a transaction with the producer smart contract or some other smart contract. The block data 323 of block N+Q 322 is illustrated as including a pseudonym and a token 324. The data producer may have stored the pseudonym and token 324 on the block chain as data or a transaction. The transaction may have been a transaction with the producer smart contract or some other smart contract. The block data 326 of block N+R 325 is illustrated as including an engagement request 327 that includes the pseudonym and the token 328. The data producer may have stored the engagement request 327 on the block chain as data or a transaction. The transaction may have been a transaction with the producer smart contract or some other smart contract.

Figure 4:
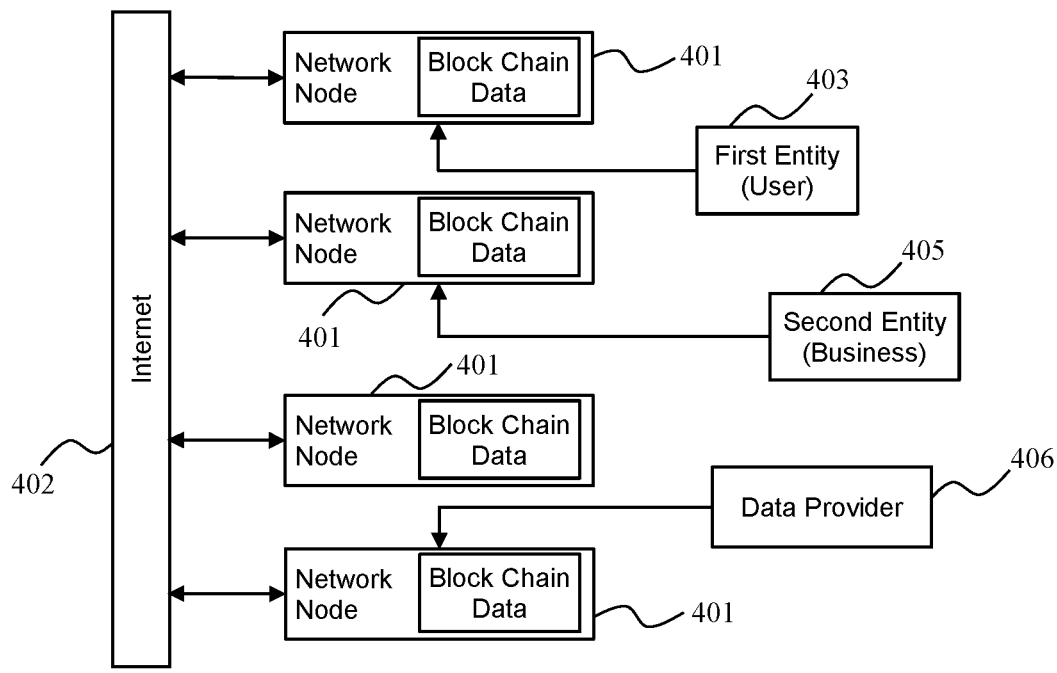
FIG. 4 depicts network nodes maintaining a block chain, according to embodiments disclosed herein.

FIG. 4 depicts network nodes 401 maintaining a block chain, according to embodiments disclosed herein. The network nodes 401 are illustrated as being able to communicate via the internet 402 and as having block chain data. Block chains are commonly maintained by many network nodes 401 with each maintaining its own version of the block chain. In a trustless environment, the network nodes do not trust each other to have accurate copies of the block chain and therefor process and store each block as it is signed. The block chain maintenance and execution code 107 run by the network nodes 401 can be different programs written to implement a published standard for the block chain. The smart contract VM 119 run by the network nodes 401 can implement a standardized VM specified for the block chain. Note that the smart contract VM 119 can be considered to be executable code within the block chain execution and maintenance code 107 of the network nodes 401. The smart contracts are executable code that can be executed by a smart contract VM. For example, an entity can enter a transaction on the block chain 300 that provides input data to and invokes a method or subroutine within the smart contract. The smart contract VM can run the method or subroutine using the input data and store the result on the block chain. Those practiced in the art of block chain distributed applications (dApps) are familiar with writing, deploying, accessing, transacting with, and interacting with smart contracts.

The first entity 403 is shown interacting with one of the network nodes 401. The second entity 405 is also shown interacting with one of the network nodes 401. In addition, the data provider 406 is shown interacting with one of the network nodes 401. By interacting with the network nodes 401, the entities 403, 405, 406 can submit data and transactions for storage on the block chain. Some of the data and transactions stored on the block chain can be processed by smart contracts that store output data on the block chain.

Figure 5:
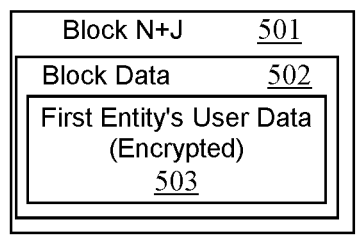
FIG. 5 is a high-level block diagram of a block of a block chain storing the first entity's encrypted user data, according to embodiments disclosed herein.

FIG. 5 is a high-level block diagram of a block of a block chain storing the first entity's user data, according to embodiments disclosed herein. Block N+J 501 can include block data 502 that includes the first entity's user data in encrypted form 503 or can include a hash pointer to that data stored in an open storage like IPFS or similar. As discussed above, blocks can contain other fields and data such as time stamps, previous block hashes, etc. The first user's data can be provided to an entity by sharing the decryption key for the data stored at N+J. Validation data, described in detail below, is an example of user data that can be stored encrypted on a block chain.

Figure 6:
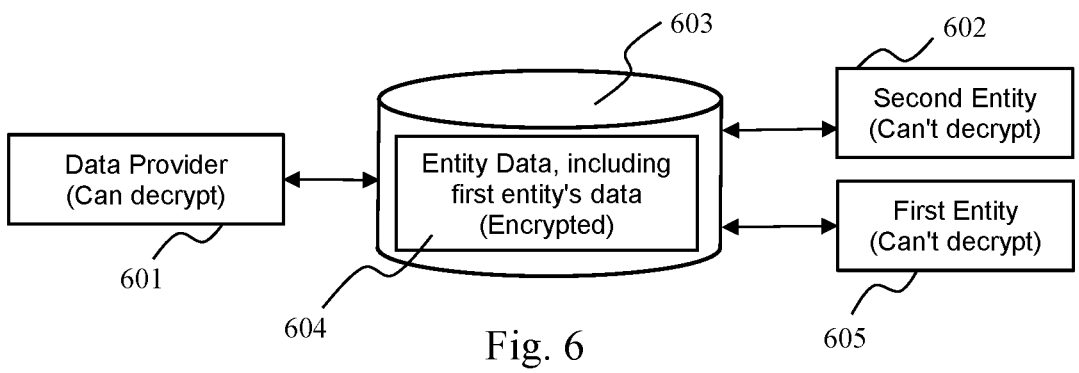
FIG. 6 is a high-level block diagram of a data store storing encrypted entity data, according to embodiments disclosed herein.

FIG. 6 is a high-level block diagram of a data store 603 storing entity data 604, including the first entity's user data, in encrypted form, according to embodiments disclosed herein. The data provider 601 can store the entity data on the block chain 300 or in the data store 603. The data being encrypted, the first entity 605 and the second entity 602 can't read the data. If the datastore contains the data provider's database, it would be expected for access to be restricted such that the first entity 605 and the second entity 602 can't access the encrypted data. The data provider, having the decryption keys, can read the data stored in encrypted form on the block chain or in the data store. Alternatively, the encrypted data can be held in widely accessible datastore such as IPFS. The encrypted data can be validation data wherein sharing the key provides access.

Figure 7:
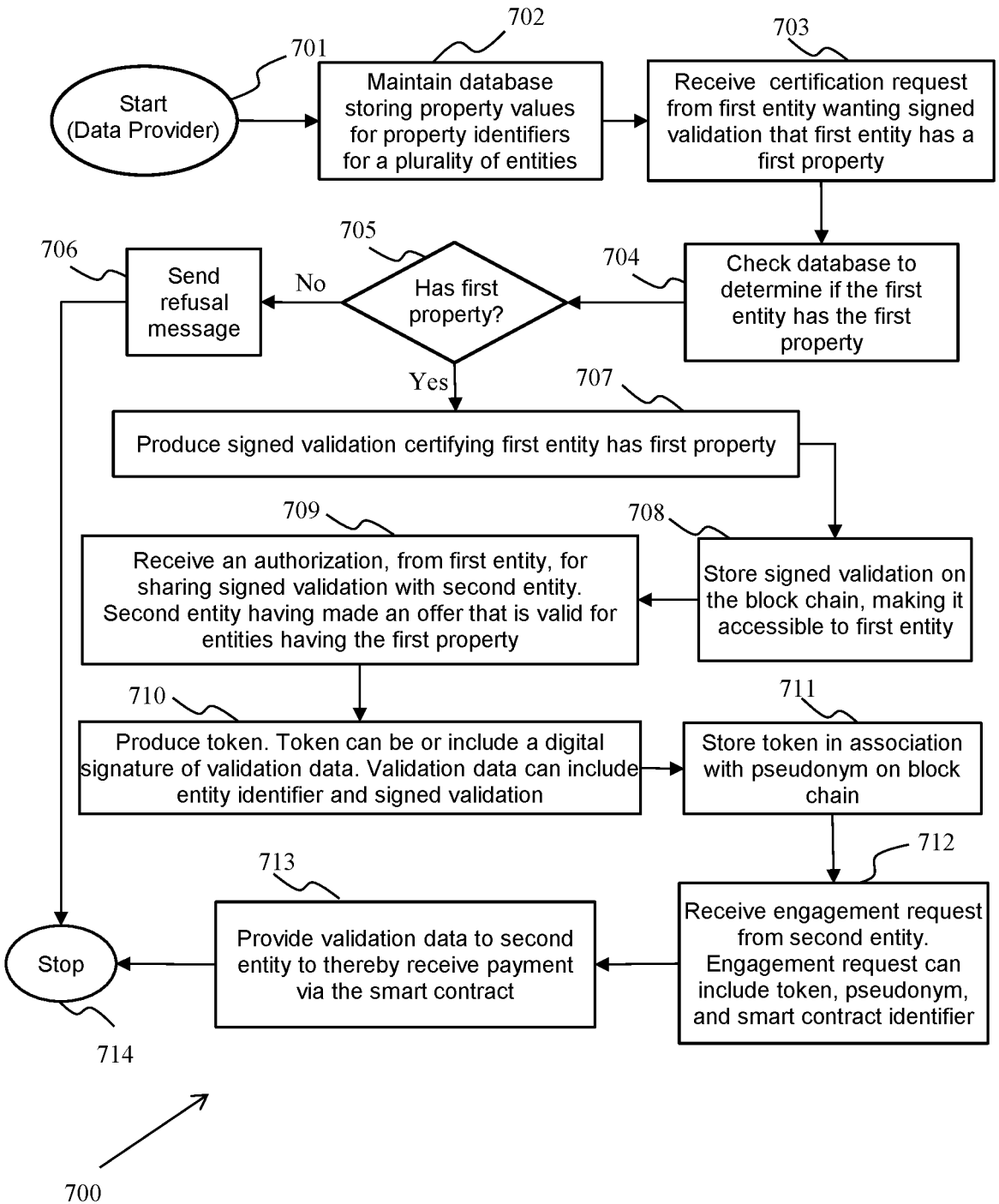
FIG. 7 is a flow chart illustrating an example of a method for preserving privacy and incentivizing third-party data sharing, according to embodiments disclosed herein.

FIG. 7 is a flow chart illustrating an example of a method 700 for preserving privacy and incentivizing third-party data sharing, according to embodiments disclosed herein. Having started 701, the data provider is maintaining a database storing property values for property identifiers for a plurality of entities. The entities can include the first entity and other users, many of whom may be interested in the second entity's offer. The property identifiers can indicate what the property is such as address, location, email address, age, credit score, the result of the data provider's proprietary analytics, or any other such data field. The property value is the user specific value for a property identifier. For example, property identifier "age" can have the property value "42" for a specific entity. Those practiced in the art of user databases are aware of the fields and values used in prior art user databases.

A certification request is received from a first entity requesting a signed validation that the first entity has a first property 703. The first property can be a specified in the certification request by property identifier and desired value or range, as a Boolean expression with many property identifiers having desired values or ranges, or as a reference to the second entity's offer which can specify the first property. Knowing the identity of the first entity and knowing the first property, checking the database can reveal if the first entity has the first property 704. If the first entity does not have the first property 705, a refusal message can be sent 706 indicating no signed validation is coming before the process stops 714. If the first entity has the first property 705, the signed validation can be produced 707. A validation can be a statement or data asserting that, according to the data provider, the first entity has the first property. Digitally signing the validation, using a secret signing key, produces a signed validation that can be verified as coming from the data provider. The signed validation can be provided to the first entity by storing it on a block chain 708 or otherwise placing it or sending it to wherever the first entity can obtain it.

The data provider can receive an authorization, from the first entity, to share the signed validation with the second entity 709. As discussed above, the second entity may have made an offer that is valid for entities having the first property and the first entity is interested in the offer. Having received the authorization, a token can be produced 710. The token can be a digital signature of validation data. The validation data can include an entity identifier and a signed validation. An entity identifier can be or include a string, number, or other data that can uniquely identify the user. The entity identifier can be or include contact information useful for contacting the first entity. The token and a pseudonym for the user can be stored on the block chain 711 or otherwise placing it or sending it to where the second entity can find it.

An engagement request can be received from the second entity 712. The engagement request can include the token, the pseudonym, and a smart contract identifier for a smart contract. The smart contract can be stored on the block chain and accessed using the smart contract identifier. The smart contract can be configured to provide payment to the data provider when the second entity obtains access to the validation data. The token, being a digital signature of the validation data, can be used to verify that the validation data is the actual data signed by the data provider to produce the token. The data provider can therefore provide the validation data to the second entity to thereby receive payment 713 before the method stops 714. The smart contract can contain procedures, methods, or subroutines that can accept the validation data, verify it using the token, and issue the payment.

FIGS. 8-15 illustrate a number of short processes as are commonly used in asynchronous processing or event driven processing. Smart contracts can be written to contain short processes to thereby avoid having to wait for input. In contrast, the method of FIG. 7 could have wait states such that the method waits at certain points for input to be received, such as before elements 703, 709 and 712. One practiced in the programming arts is familiar with implementing processes as synchronous, possibly with wait states, or as asynchronous, possibly event driven.

Figure 8:
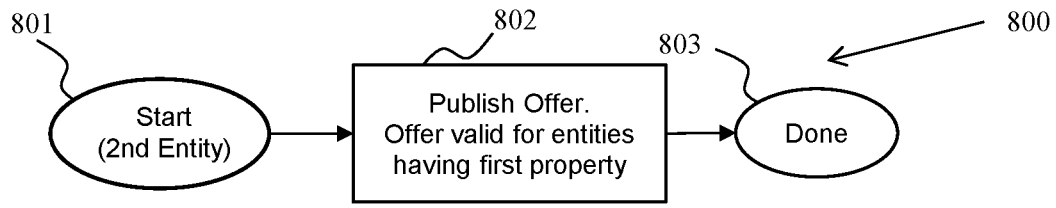
FIG. 8 is a flow chart illustrating an example of a second entity publishing an offer, according to embodiments disclosed herein.

FIG. 8 is a flow chart illustrating an example of a second entity publishing an offer 800, according to embodiments disclosed herein. After the start 801, the second entity publishes the offer 802 before the process is done 803. The offer may be valid only for entities having the first property. The offer itself can be an offer of special pricing, inclusion in an event, an invitation, a gift, or some other offer such as those made in advertisements or between individuals.

Figure 9:
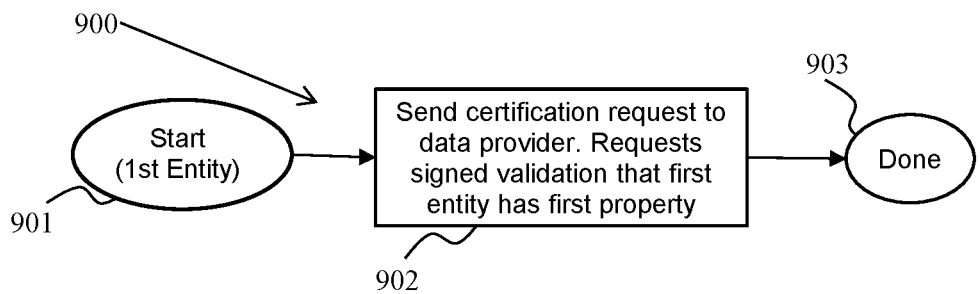
FIG. 9 is a flow chart illustrating an example of a first entity sending a certification request to a data provider, according to embodiments disclosed herein.

FIG. 9 is a flow chart illustrating an example of a first entity sending a certification request 900 to a data provider, according to embodiments disclosed herein. After the start 901, the first entity sends a certification request to the data provider 902 before finishing 903. The certification request requests a signed validation certifying that the first entity has the first property.

Figure 10:
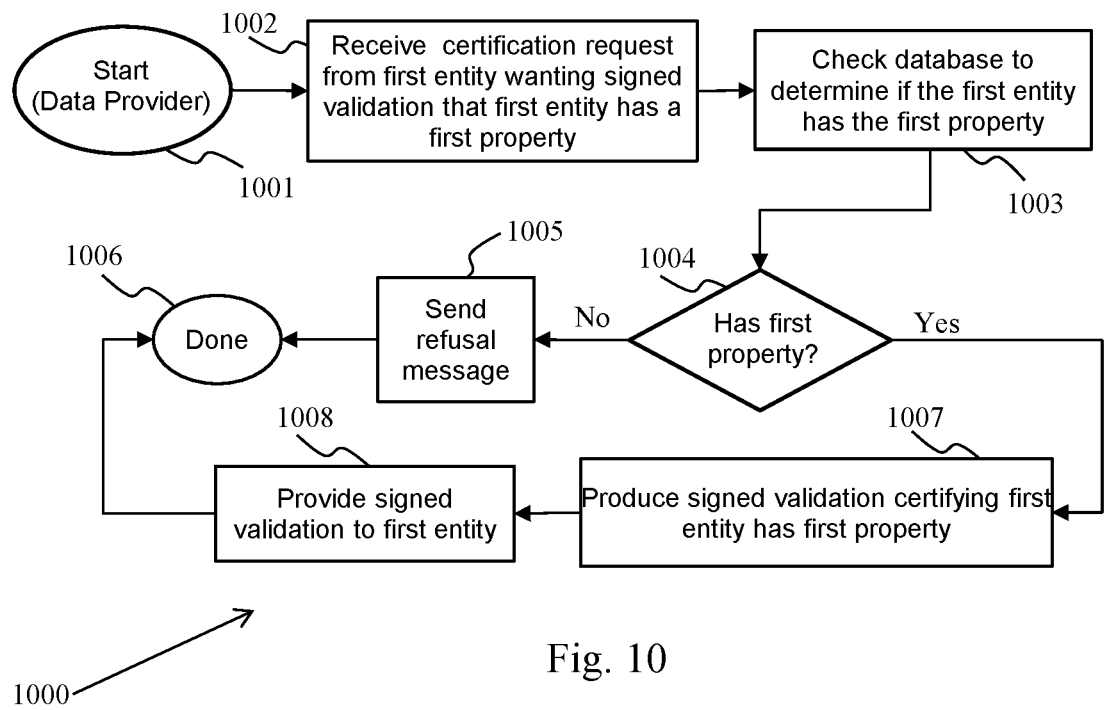
FIG. 10 is a flow chart illustrating an example of a data provider providing a signed validation, according to embodiments disclosed herein.

FIG. 10 is a flow chart illustrating an example of a data provider providing a signed validation 1000, according to embodiments disclosed herein. Having started 1001, the data provider has received a certification request from the first entity, the first entity wanting a signed validation that first entity has a first property 1002. The data provider checks the database to determine if the first entity has the first property 1003. If the first entity does not have the first property 1004, a refusal message can be sent 1005 before the process completes 1006. Otherwise, the data provider can produce the signed validation 1007 and provide the signed validation to the first entity 1008 before the process completes 1006. The digital signature of the signed validation can be provided along with the signed validation.

Figure 11:
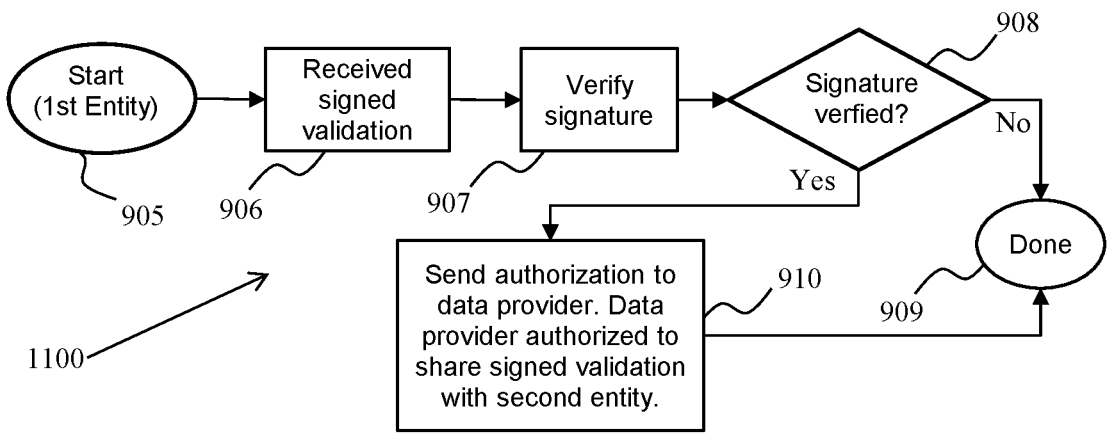
FIG. 11 is a flow chart illustrating an example of a first entity sending an authorization, according to embodiments disclosed herein.

FIG. 11 is a flow chart illustrating an example of a first entity sending an authorization 1100, according to embodiments disclosed herein. Having started 905, the first entity has received the signed validation 906. The signed validation's digital signature can be verified 907. If verification fails 908, the process stops 909. If verification succeeds 908, the first entity can send an authorization to the data provider 910 before the process stops 909. The authorization authorizes the data provider to share the signed validation with the second entity.

Figure 12:
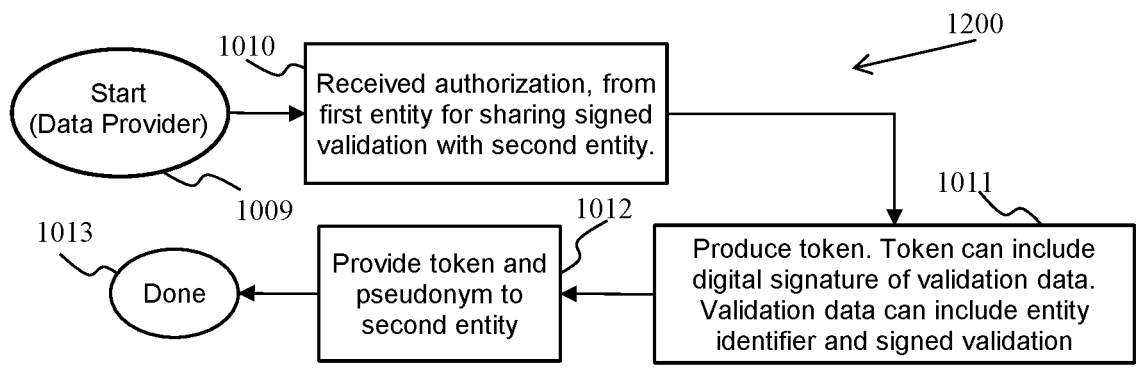
FIG. 12 is a flow chart illustrating an example of a data provider providing a token and a pseudonym, according to embodiments disclosed herein.

FIG. 12 is a flow chart illustrating an example of a data provider providing a token and a pseudonym 1200, according to embodiments disclosed herein. Having started 1009, the data provider has received the authorization from the first entity 1010. A token can be produced 1011. The token can be the digital signature of validation data. The validation data can include an entity identifier and the signed validation. The token and a pseudonym can be provided to the second entity 1012 before the process stops 1013.

Figure 13:
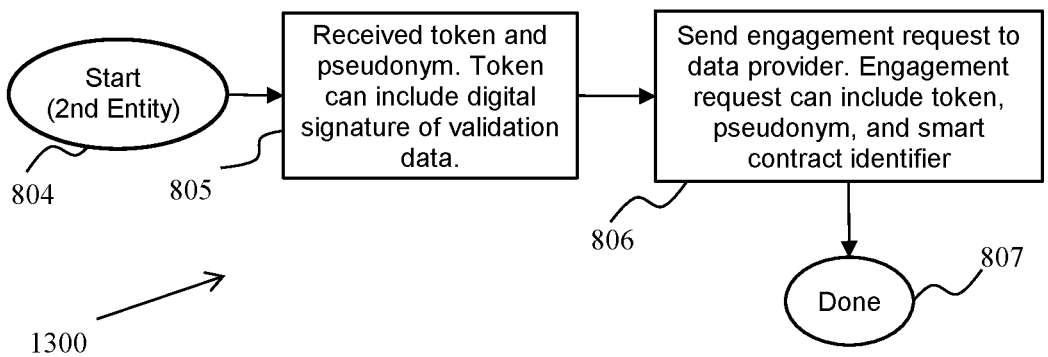
FIG. 13 is a flow chart illustrating an example of a second entity sending an engagement request, according to embodiments disclosed herein.

FIG. 13 is a flow chart illustrating an example of a second entity sending an engagement request 1300, according to embodiments disclosed herein. Having started 804, the second entity has received the token and the pseudonym 805. The second entity can send an engagement request to the data provider 806 before the process stops 807. The engagement request can include the token, the pseudonym, and a smart contract identifier.

Figure 14:
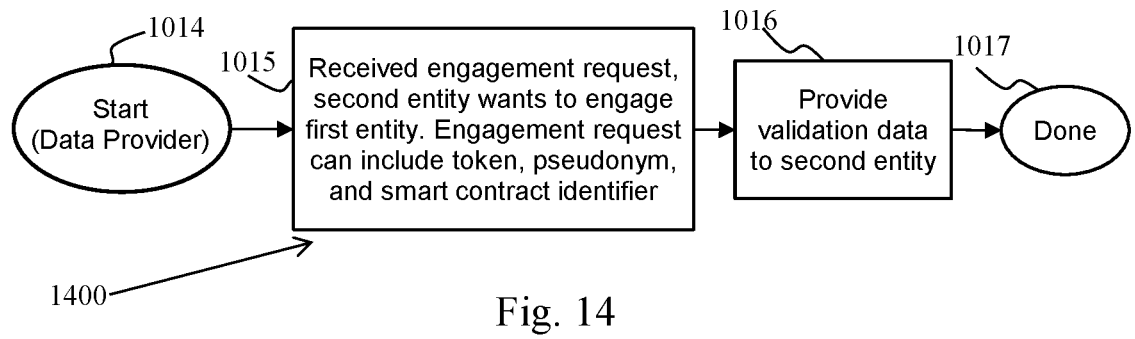
FIG. 14 is a flow chart illustrating an example of a data provider responding to an engagement request, according to embodiments disclosed herein.

FIG. 14 is a flow chart illustrating an example of a data provider responding to an engagement request 1400, according to embodiments disclosed herein. Having started 1014, the data provider has received the engagement request 1015. The second entity wants to engage first entity. In response to the engagement request, the data provider can send the validation data to the second entity 1016 before the process stops 1017. The second entity, now having the first entities identity, can directly contact the first entity.

Figure 15:
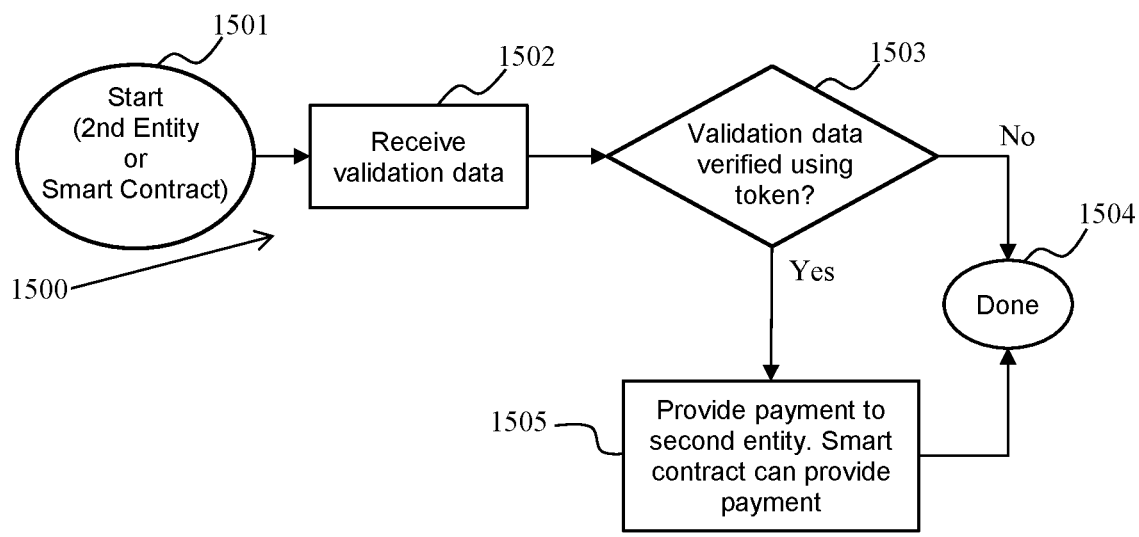
FIG. 15 is a flow chart illustrating an example of a second entity receiving payment for a verifiable lead, according to embodiments disclosed herein.

FIG. 15 is a flow chart illustrating an example of a second entity receiving payment for a verifiable lead 1500, according to embodiments disclosed herein. Having started 1501, the second entity or the smart contract has received the validation data 1502. The validation data can be verified using the token because the token is the digital signature of the validation data 1503. If verification fails, the process is done 1504. If verification succeeds, payment can be provided to the data provider 1505 before the process is done 1504. Note that placing the validation data on the block chain makes it viewable by anyone having access to the block chain. When using the smart contract to automate acceptance of the validation data, it may be advantageous to provide the validation data in encrypted form, encrypted using the second entity's public key. In such a scenario, the validation step 1503 may be skipped and payment being automatically provided at step 1505. The second entity can verify the validation data at some other time after using its private key to decrypt the validation data.

Figure 16:
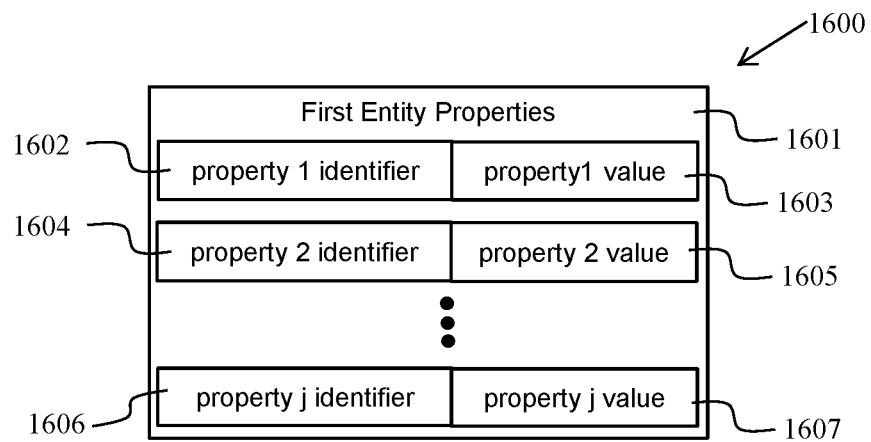
FIG. 16 is an example of first entity properties, according to embodiments disclosed herein.

FIG. 16 is an example 1600 of first entity properties 1601, according to embodiments disclosed herein. The first entity properties 1601 are illustrated as containing properties 1 through j. Property 1 has property 1 identifier 1602 and property 1 value 1603. Property 2 has property 2 identifier 1604 and property 2 value 1605. Property j has property j identifier 1606 and property j value 1607. The property 1 identifier 1602 can be "Entity Id" and the property 1 value can be "8472" or some other value uniquely associated with the first entity. Using an entity id as one of the properties can associate the properties 1601 with an entity. As discussed above, other properties stored in association with the first entity can include address, location, email address, age, credit score, the result of the data provider's analytics, or any other such data field.

Figure 17:
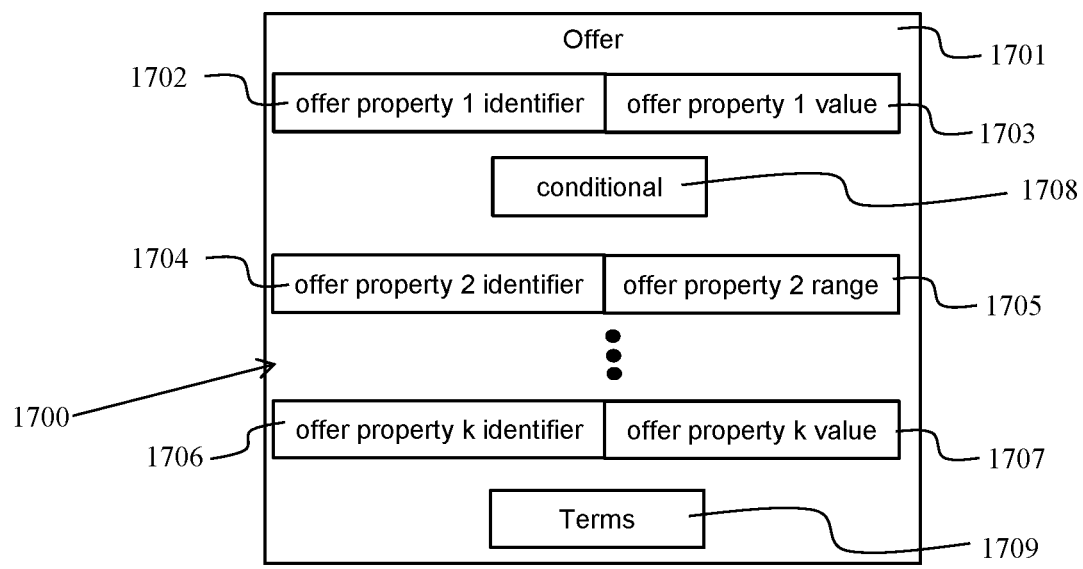
FIG. 17 is an example of an offer, according to embodiments disclosed herein.

FIG. 17 is an example 1700 of an offer 1701, according to embodiments disclosed herein. An offer can specify the properties of entities for which the offer is valid. In an offer, the property values can be specific values or can be ranges for property identifiers. The offer 1701 is illustrated as depending on offer properties 1 through k. Offer property 1 has offer property 1 identifier 1702 and offer property 1 value 1703. Offer property 2 has offer property 2 identifier 1704 and offer property 2 value 1705. Offer property j has offer property j identifier 1706 and offer property j value 1707. The conditional 1708 is representative of a Boolean expression on the offer properties. For example, a Boolean expression over offer properties can be: ((age >21) AND (relationship status=single)) AND ((location=CA) OR (location=NV)). The Terms 1709 are the terms of the agreement such as a "party in Las Vegas, $20 cover fee".

Figure 18:
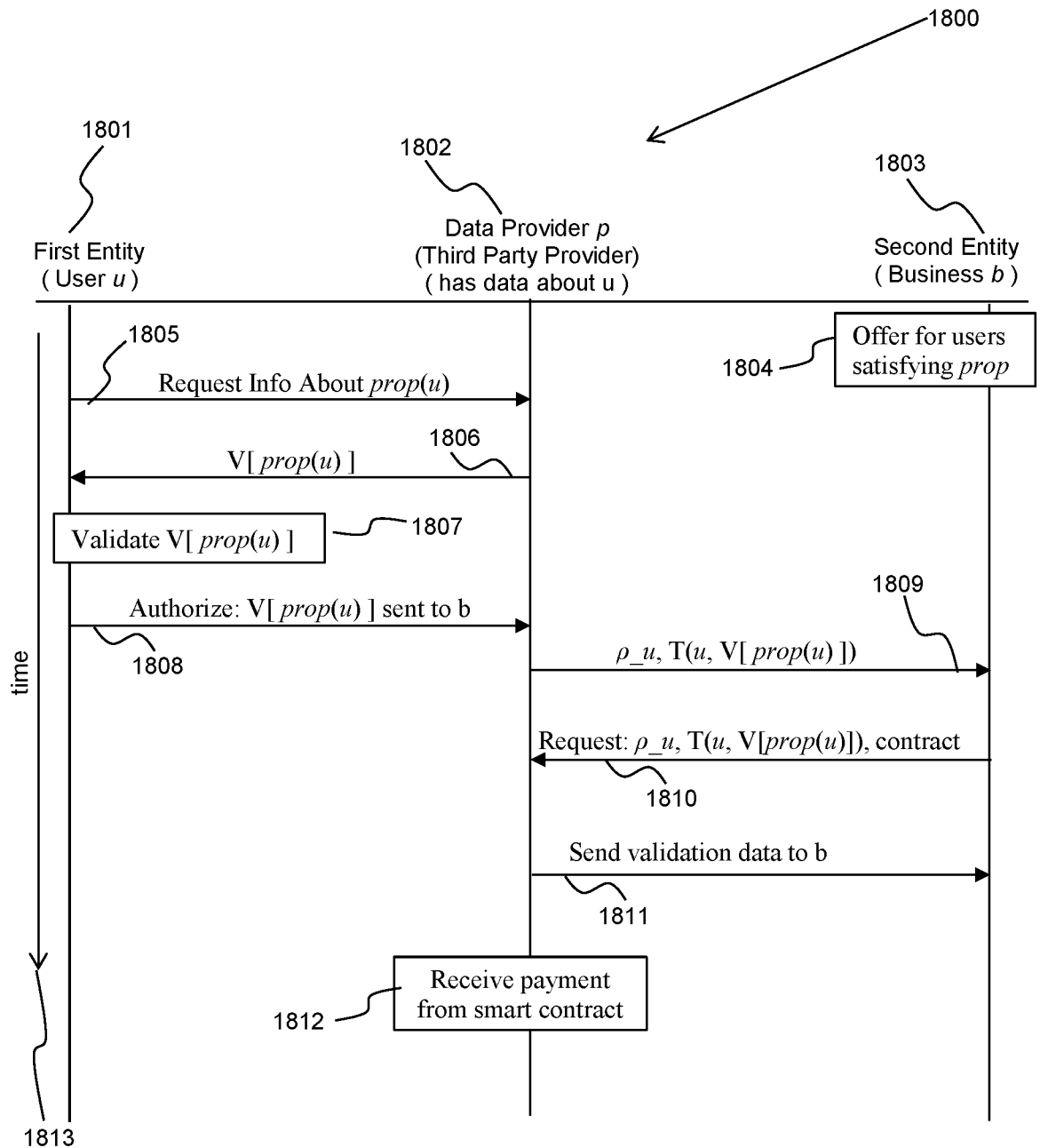
FIG. 18 illustrates messaging between a first entity, a data provider, and a second entity, according to embodiments herein.

FIG. 18 illustrates an example of messaging 1800 between a first entity 1801, a data provider 1802, and a second entity 1803, according to embodiments herein. The arrows represent messages sent from one entity to another. The messages can be sent as block chain transactions, by invoking smart contract processes or subroutines, by storage at known locations, by calling APIs (application program interfaces), as webhooks, as email, or any of the other messaging techniques known by those practiced in the art. The time axis 1813 runs down the page and the messages, by necessity, occur in the order indicated. The messages and actions occur as follows:

1. Business b 1803 posts an offer 1804 that is valid only for users that satisfy a particular property prop as discussed above in relation to FIG. 17.
2. User u doesn't have the data to check whether they satisfy prop, so sends a certification request asking data provider 1802 to create a signed validation V[prop (u)] 1805.
3. After determining that prop (u) is valid, provider p issues V[prop (u)] to u, signed by p 1806. The data provider can check the database to determine if prop (u) is valid, meaning that prop is valid for user u.
4. User u checks the validity of V[prop (u)] 1807, to verify they are eligible for the offer from b, but u doesn't learn the property values of the first entity properties 1600 (since they have not paid the provider). If valid, u authorizes sharing of the validation quantity V[prop (u)] with b, by sending a signed authorization to share with b 1808. Here, checking validity can include checking a digital signature to confirm that the data provider did sign V[prop (u).
5. Provider p sends a pseudonym ρ_u and a token T(u,V[prop (u)]) to b 1809, which gives b nothing at this point other an indication that there is an (anonymous) interested user who satisfies prop. The token can be a digital signature of validation data, the validation data can include the identity of the user and the signed validation.
6. At a later time(s), b sends an engagement request to p for the validation data corresponding to the token by issuing an engagement request specifying the pseudonym and token (encrypted and signed), along with a smart contract that can issue payment of an agreed-upon amount from b to p when p provides the corresponding validation quantity V[prop (u)] to b 1810.
7. The data provider p can send the validation data to the business b 1811. Having received the validation data, the business b can cause the smart contract to provide payment to p. The token can be used to verify the validation data. The smart contract can be configured with processes, subroutines, or methods for automatically receiving the validation data, for verifying it, and for paying the data provider. The data provider receives the payment 1812.
8. If the user continues the transaction with the business, the token T(u,V[prop (u)]) can be used to validate the identity of the user, since the user can reconstruct the token from their identity and the proof obtained in step (3).

The advantages and advancements over the prior art that can be obtained using the systems and methods disclosed herein include:

1. In step (6), the business is able to verify that the user satisfies the desired property without learning the actual raw data owned by the data provider.
2. In step (2), the user is able to initiate data sharing by explicit request.
3. In steps (3)-(4), the user does not learn the actual raw data known to the data provider, only whether or not they satisfy the property of interest.
4. In step (6), the business compensates the data provider for access to proofs of properties about user data.

A non-limiting example scenario is now provided. A retailer issues an offer that is valid only to users with a credit score greater than 700. Since a user cannot compute their own credit score, they contact a trusted third-party credit analyst to tell them whether their credit score is greater than 700. If so, the user can ask the credit analyst to share this property with the retailer, without disclosing the identity of the user or their actual credit score. The retailer gets a verifiable lead in exchange for a small payment to the credit analyst (via the smart contract). If the user wants to continue with the transaction, they must then disclose their identity, which can then be validated using the token. Here, the credit analyst is incentivized to participate because the credit analyst is paid for the verifiable lead.

The example illustrated above may also include more complex conditions on the users that are eligible for the offer. In the above example scenario, this could be expanded by allowing the retailer to further restrict to geographic areas, to which the user can ask the third-party provide to include the conjunction of their location information and credit score in the validation quantity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
   maintaining a database configured to store a plurality of property values for a plurality of property identifiers in association with a plurality of entities;
   receiving, from a first entity, a certification request for a signed validation indicating that the first entity has a first property regarding at least one of the property identifiers;
   determining, based on the database, that the first entity does have the first property;
   producing the signed validation certifying that the first entity does have the first property, the signed validation being cryptographically signed and not revealing the property values for the at least one of the property identifiers associated with the first entity;
   providing the signed validation to the first entity; and
   receiving an authorization wherein the first entity authorizes sharing the signed validation with a second entity, the second entity having made an offer that is valid for entities having the first property, and wherein an identity of the first entity is masked from the second entity in the signed validation.

2. The method of claim 1 further comprising:
   producing a token comprising a digital signature of validation data comprising an entity identifier and the signed validation, the entity identifier identifying the first entity; and
   providing the second entity with a pseudonym and the token, the pseudonym masking an identity of the first entity from the second entity.

3. The method of claim 2 further comprising providing at least one validation key to the first entity and the second entity;
   the signed validation being verifiable using at least one of the at least one validation key; and
   the token being verifiable using at least one of the at least one validation key.

4. The method of claim 2 further comprising:
   receiving an engagement request from the second entity, the engagement request comprising the pseudonym; and
   providing the engagement request to the first entity.

5. The method of claim 2 further comprising:
   receiving an engagement request from the second entity, the engagement request comprising the pseudonym and the token; and
   providing the engagement request to the first entity.

6. The method of claim 2 further comprising:
   receiving an engagement request from the second entity, the engagement request comprising the pseudonym, the token, and a smart contract identifier for a smart contract; and
   providing the engagement request to the first entity;
   wherein the smart contract is stored on a block chain maintained by a plurality of network nodes and wherein the smart contract is configured to issue a payment from the second entity to a data provider upon receiving the signed validation from the data provider.

7. The method of claim 2 wherein the first entity and the second entity do not have access to the property values and property identifiers.

8. A method comprising:
   maintaining a database configured to store a plurality of property values for a plurality of property identifiers in association with a plurality of entities;
   receiving, from a first entity, a certification request for a signed validation indicating that the first entity has a first property regarding at least one of the property identifiers, wherein the certification request is stored on a block chain maintained by a plurality of network nodes;
   determining, based on the database, that the first entity does have the first property;
   producing the signed validation certifying that the first entity does have the first property, the signed validation being cryptographically signed; and
   storing the signed validation on the block chain in association with the certification request; and
   receiving an authorization wherein the first entity authorizes sharing the signed validation with a second entity, the second entity having made an offer that is valid for entities having the first property, the authorization being stored on the block chain and wherein an identity of the first entity is masked from the second entity in the signed validation,
   wherein the block chain is accessible by the first entity and a data provider, the data provider maintaining the database.

9. The method of claim 8 wherein a producer smart contract is stored on the block chain, and wherein the producer smart contract accepts the certification request.

10. The method of claim 8, wherein a producer smart contract is stored on the block chain, and wherein the producer smart contract is configured to provide verification that the signed validation was signed by the data provider.

11. The method of claim 8 further comprising:
producing a token comprising a digital signature of validation data comprising an entity identifier and the signed validation, the entity identifier identifying the first entity; and
storing in the token in association with a pseudonym on the block chain, the block chain being accessible by the second entity, the pseudonym masking an identity of the first entity from the second entity.

12. The method of claim 11 wherein an offer smart contract is stored on the block chain and wherein storing the pseudonym in association with the token comprises providing the pseudonym and the token to the offer smart contract.

13. The method of claim 11 wherein a producer smart contract is stored on the block chain, and wherein the producer smart contract receives the authorization.

14. The method of claim 11, wherein a producer smart contract is stored on the block chain, and wherein the producer smart contract is configured to provide verification that the token was signed by the data provider.

15. The method of claim 11 further comprising:
providing at least one validation key to the first entity and the second entity, the signed validation being verifiable using at least one of the at least one validation key, and the token being verifiable using at least one of the at least one validation key;
receiving an engagement request from the second entity, the engagement request comprising the pseudonym, the token, and a smart contract identifier for a smart contract configured to issue a payment from the second entity to the data provider upon receiving the signed validation from the data provider; and
providing the engagement request to the first entity;
wherein an offer smart contract is stored on the block chain;
wherein storing the pseudonym in association with the token comprises providing the pseudonym and the token to the offer smart contract;
wherein a producer smart contract is stored on the block chain;
wherein the producer smart contract receives the authorization;
wherein the producer smart contract is configured to provide verification that the token was signed by the data provider;
wherein the producer smart contract accepts the certification request;
wherein the producer smart contract is configured to provide verification that the signed validation was signed by the data provider; and
wherein the first entity and the second entity do not have access to the property values and property identifiers.

16. A computer readable storage device storing computer readable instructions, that when executed on one or more processor devices, implements a method for preserving privacy and incentivizing third-party data sharing, the method comprising:
maintaining a database configured to store a plurality of property values for a plurality of property identifiers in association with a plurality of entities;
receiving, from a first entity, a certification request for a signed validation indicating that the first entity has a first property regarding at least one of the property identifiers;
determining, based on the database, that the first entity does have the first property;
producing the signed validation certifying that the first entity does have the first property, the signed validation being cryptographically signed and not revealing the property values for the at least one of the property identifiers associated with the first entity;
providing the signed validation to the first entity; and
receiving an authorization wherein the first entity authorizes sharing the signed validation with a second entity, the second entity having made an offer that is valid for entities having the first property, and wherein an identity of the first entity is masked from the second entity in the signed validation.

17. The computer readable storage device storing computer readable instructions of claim 16, wherein the method further comprises:
producing a token comprising a digital signature of validation data comprising an entity identifier and the signed validation, the entity identifier identifying the first entity; and
providing the second entity with a pseudonym and the token, the pseudonym masking an identity of the first entity from the second entity.

18. The computer readable storage device storing computer readable instructions of claim 17, wherein the method further comprises:
receiving an engagement request from the second entity, the engagement request comprising the pseudonym; and
providing the engagement request to the first entity.

19. The computer readable storage device storing computer readable instructions of claim 17, wherein a producer smart contract is stored on a block chain maintained by a plurality of network nodes, and wherein the producer smart contract accepts the certification request.

20. The computer readable storage device storing computer readable instructions of claim 17, wherein the method further comprises providing at least one validation key to the first entity and the second entity, the signed validation being verifiable using at least one of the at least one validation key, the token being verifiable using at least one of the at least one validation key.

* * * * *